United States Patent
Ramos Cantor et al.

(10) Patent No.: US 12,526,695 B2
(45) Date of Patent: Jan. 13, 2026

(54) METHODS AND APPARATUSES FOR RADIO COMMUNICATION

(71) Applicant: Robert Bosch GmbH, Stuttgart (DE)

(72) Inventors: Oscar Dario Ramos Cantor, Hildesheim (DE); Hugues Narcisse Tchouankem, Hemmingen (DE); Marie-Theres Suer, Braunschweig (DE)

(73) Assignee: ROBERT BOSCH GMBH, Stuttgart (DE)

( * ) Notice: Subject to any disclaimer, the term of this patent is extended or adjusted under 35 U.S.C. 154(b) by 453 days.

(21) Appl. No.: 17/822,888

(22) Filed: Aug. 29, 2022

(65) Prior Publication Data

US 2023/0108302 A1    Apr. 6, 2023

(30) Foreign Application Priority Data

Oct. 6, 2021 (EP) ..................................... 21201094

(51) Int. Cl.
*H04W 28/24* (2009.01)
*H04W 24/08* (2009.01)
*H04W 28/02* (2009.01)

(52) U.S. Cl.
CPC ........... *H04W 28/24* (2013.01); *H04W 24/08* (2013.01); *H04W 28/0268* (2013.01)

(58) Field of Classification Search
CPC . H04W 28/24; H04W 24/08; H04W 28/0268; H04W 24/04; H04L 43/08; H04L 41/147
See application file for complete search history.

(56) References Cited

U.S. PATENT DOCUMENTS

| 2021/0112441 A1* | 4/2021 | Sabella | ................. H04W 24/04 |
| 2023/0074288 A1* | 3/2023 | Filippou | ........... H04W 28/0236 |

FOREIGN PATENT DOCUMENTS

| WO | 202022745 A1 | 1/2020 | |
| WO | 2021067140 A1 | 4/2021 | |
| WO | WO-2023036440 A1 * | 3/2023 | ......... H04L 41/0894 |

OTHER PUBLICATIONS

Mach,e t al.: "D2D-based QoS prediction analysis in beyond 5G V2X", ICC 2021—IEEE International Conference on Communications, IEEE, Jun. 14, 2021, pp. 1-5, XP033953511.

(Continued)

*Primary Examiner* — Rina C Pancholi
(74) *Attorney, Agent, or Firm* — NORTON ROSE FULBRIGHT US LLP

(57) ABSTRACT

A method for radio communication. The method includes: receiving at least one first information that characterizes at least one operational parameter associated with an application; receiving at least one second information that characterizes at least one operational parameter associated with a radio access network; determining at least one QoS prediction that characterizes a future QoS associated with the application based at least on the at least one first information and on the at least one second information; and transmitting or providing the at least one QoS prediction.

21 Claims, 5 Drawing Sheets

(56) References Cited

OTHER PUBLICATIONS

Palaios, et al.: "Network under Control: Multi-Vehicle E2E Measurements for Al-based QoS Prediction", 2021 IEEE 32nd Annual International Symposium on Personal, Indoor and Mobile Radio Communications (PIMRC), IEEE, Sep. 13, 2021, pp. 1432-1438, XP034004910.

"3rd Generation Partnership Project; Technical Specification Group Servicesand System Aspects; Study on enablers for network automation for the 5G System (5GS); Phase 2 (Release 17)", 3GPP Standard; Technical Report; 3GPP TR 23.700-91, Mobile Competence Ctr.; France, vol. SA WG2, No. V17.0.0, (2020), pp. 1-382, XP051999941, URL:https://ftp.3gpp.org/Specs/latest/Rel-17/23_series/23700-91-h00.zip.

"3rd Generation Partnership Project; Technical Specification Group Services and System Aspects; Management and orchestration; Study on enhancement of Management Data Analytics (MOA) (Release 17)", 3GPP Draft; TR 28.809 V2.00 SP-210139, Mobile Competence Centre; France, (2021), XP051988998, pp. 1-99, URL:https://ftp.3gpp.org/tsg_sa/TSG_SA/TSGs_91 E_Electronic/Docs/SP-210139.zip 28809-200.docx[retrieved on Mar. 17, 2021].

5GAA SA WG2 Meeting #S2-129: "LS on Requirements to enable Predictive QoS for Automotive industry", France, vol. SA WG2, Dongguan, China; (2018), XP051539008, pp. 1-10; URL:http://www.3gpp.org/ftp/tsg%5Fsa/WG2%5FArch/TSGS2%5F129%5FDongguan/Docs/S2%2D1810010%2Ezip [retrieved on Sep. 19, 2018].

* cited by examiner

METHODS AND APPARATUSES FOR RADIO COMMUNICATION

CROSS REFERENCE

The present application claims the benefit under 35 U.S.C. § 119 of European Patent Application No. EP 21 20 1094.6 filed on Oct. 6, 2021, which is expressly incorporated herein by reference in its entirety.

FIELD

The present invention relates to advantages in radio communications.

SUMMARY

Certain problems of the related are may be solved by methods and apparatuses according to the present invention.

A first aspect of the present invention is directed to a method comprising: receiving at least one first information that characterizes at least one operational parameter associated with an application; receiving at least one second information that characterizes at least one operational parameter associated with a radio access network; determining at least one quality of service (QoS) prediction that characterizes a future QoS associated with the application based at least on the at least one first information and on the at least one second information; and transmitting or providing the at least one QoS prediction.

By exploiting the application-specific information available, the quality of the QoS prediction is increased. Especially for industrial campus networks, the accessibility to network and application information is to be expected in future implementations.

In other words, the resulting prediction in form of the future QoS is transmitted back to the network and/or the application side. In this way, reactions at any of the sides, i.e. application and network, can be performed in order to guarantee a certain QoS level for the application. Moreover, the communication exchange between application and network sides is extended; such that a coordination of the reactions carried out independently do not affect negatively the experienced QoS.

A second aspect of the present invention is directed to an apparatus comprising: receiving means to receive at least one first information that characterizes at least one operational parameter associated with an application; receiving means to receive at least one second information that characterizes at least one operational parameter associated with a radio access network; determining means to determine at least one QoS prediction that characterizes a future QoS associated with the application based at least on the at least one first information and on the at least one second information; and transmitting means to transmit or provide the at least one QoS prediction.

A third aspect of the present invention is directed to a method comprising: transmitting at least one information that characterizes at least one first operational parameter associated with an application; receiving at least one QoS prediction that characterizes a future QoS associated with the application; determining, based on the at least one QoS prediction, at least one second operational parameter associated with the application; receiving at least one coordination indicator; and executing at least one function of the application based on the received at least one coordination indicator.

The QoS prediction and the received coordination indicator are advantageously used to execute a proactive application reaction that guarantees the QoS level of the application.

According to an advantageous example embodiment of the present invention, the method comprises: determining at least one further coordination indicator that is indicative of the at least one determined second operational parameter of the application; and transmitting the at least one further coordination indicator.

According to an advantageous example embodiment of the present invention, the method comprises: determining a reaction on the received at least one coordination indicator, wherein the reaction comprises: maintaining the determined at least one second operational parameter or adapting the at least one second operational parameter based on the received at least one coordination indicator; and wherein the execution of the at least one function of the application is conducted based on the maintained at least one second operational parameter or based on the adapted at least one second operational parameter.

According to an advantageous example embodiment of the present invention, the received coordination indicator is associated with or comprises an operational parameter of another type of application.

Advantageously, a distributed coordination is able to coordinate itself with the network.

According to an advantageous example embodiment of the present invention, the received coordination indicator is associated with or comprises an operational parameter of a radio access network.

Advantageously, the application is able to negotiate the QoS with the radio access network.

A fourth aspect of the present invention is directed to an apparatus comprising: transmitting means to transmit at least one information that characterizes at least one first operational parameter associated with an application; receiving means to receive at least one QoS prediction that characterizes a future QoS associated with the application; determining means to determine, based on the at least one QoS prediction, at least one second operational parameter associated with the application; receiving means to receive at least one coordination indicator; and executing means to execute at least one function of the application based on the received at least one coordination indicator.

A fifth aspect of the present invention is directed to a method comprising: transmitting at least one information that characterizes at least one first operational parameter associated with a radio access network; receiving at least one QoS prediction that characterizes a future QoS associated with an application; determining, based on the at least one QoS prediction, at least one second operational parameter associated with the radio access network; receiving at least one coordination indicator; and executing at least one function of the radio access network based on the received at least one coordination indicator.

Advantageously, the application provides information not only from a particular device, but also for a subset or a majority of devices connected at a certain point of time. This additional information can contribute, for instance, to have a better estimation of the resource utilization from the prediction apparatus.

The obtained QoS prediction and the received coordination indicator are advantageously used to execute a proactive network reaction that guarantees the QoS level of the application.

According to an advantageous example embodiment of the present invention, the method comprises: determining at least one further coordination indicator that is indicative of the at least one determined second operational parameter of the radio access network; and transmitting the at least one further coordination indicator.

According to an advantageous example embodiment of the present invention, the method comprises: determining a reaction on the received at least one coordination indicator, wherein the reaction comprises: maintaining the determined at least one second operational parameter or adapting the at least one second operational parameter based on the received at least one coordination indicator; and wherein the execution of the at least one function of the radio access network is conducted based on the maintained at least one second operational parameter or based on the adapted at least one second operational parameter.

According to an advantageous example embodiment of the present invention, the coordination indicator is associated with or comprises an operational parameter of the application.

Advantageously, applications and the radio access network, the applications are associated with, coordinate their operational parameters.

According to an advantageous example embodiment of the present invention, the coordination indicator of the received coordination message is associated with or comprises an operational parameter of the radio access network.

Advantageously, the radio access network is able to adapt its operational parameters.

A sixth aspect of the present invention is directed to an apparatus comprising: transmitting means to transmit at least one information that characterizes at least one first operational parameter associated with a radio access network; receiving means to receive at least one QoS prediction that characterizes a future QoS associated with an application; determining means to determine, based on the at least one QoS prediction, at least one second operational parameter associated with the radio access network; receiving means to receive at least one coordination indicator; and executing means to determine at least one function of the radio access network based on the received at least one coordination indicator.

DETAILED DESCRIPTION OF EXAMPLE EMBODIMENTS

Figure 1:
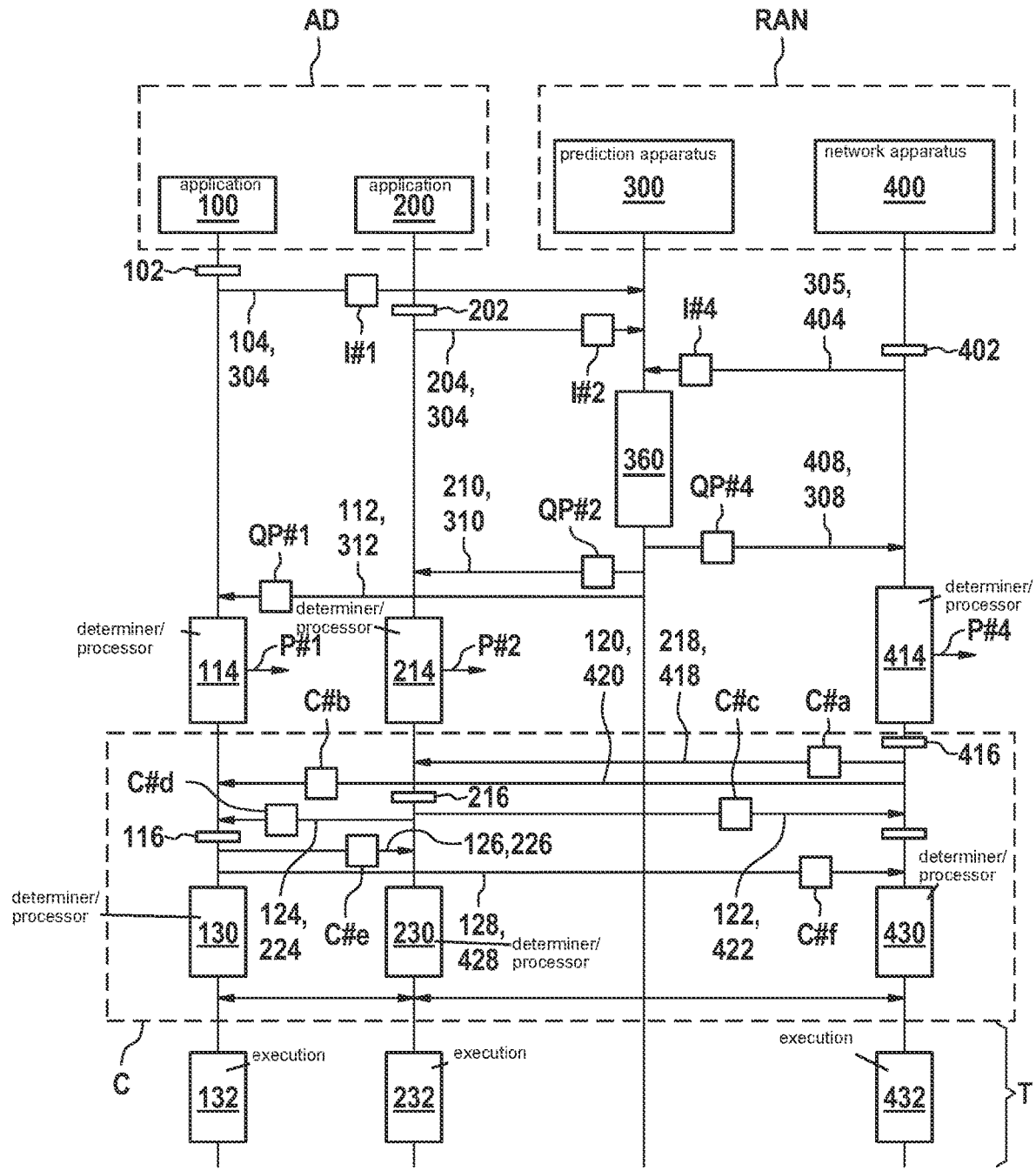
FIG. 1 depicts a schematic sequence diagram, according to an example embodiment of the present invention.

FIG. 1 depicts a schematic sequence diagram. An application apparatus 100, 200 is arranged for example in an application client at a radio terminal or at an application server accessible through the radio access network. The application apparatus 100, 200 in an application domain AD comprises determining means (i.e., determining devices) 102, 202 to determine an information I #1, I #2 that characterizes a first present operational parameter of the application 100, 200. The first information includes e.g. current and future position and trajectories of multiple devices. The first information also includes at least one of: a number, a size and a periodicity of application messages sent via radio resources. Transmitting means (i.e., transmitter(s)) 104, 204 transmit information I #1, I #2 that characterizes a first present operational parameter associated with an application 100, 200.

A prediction apparatus 300 comprises receiving means (i.e., receiver(s)) 304 to receive the first information I #1, I #2 that characterizes the operational parameter associated with the application 100, 200. Receiving means (i.e., receiver(s)) 305 receive second information I #4 that characterizes at least one operational parameter associated with a radio access network RAN. According to an example, the apparatus 300 is running on an apparatus 400. According to an example, the apparatus 300 is running on a server apart from the apparatus 400.

The apparatus 400 comprises determining means (i.e., a determining device) 402 to determine an information I #4 that characterizes a first present operational parameter of the radio access network RAN. The information I #4 includes at least one of: a radio parameter like RSSI, RSRP, RSRQ or a network parameter like a base station load or the like. Transmitting means 104, 204 transmit information I #1, I #2 that characterizes a first present operational parameter associated with an application 100, 200. Transmitting means (i.e., transmitter(s)) 404 transmit the information I #4 that characterizes the first operational parameter associated with a radio access network RAN 400.

Determining or processing means (determining or processing device(s)) 306 determine the QoS prediction QP #1, QP #2, QP #4 that characterizes a future QoS associated with the application 100, 200 or radio access network RAN based at least on the first information I #1, I #2 and on the second information I #4. The QoS prediction QP #1, QP #2, QP #4 is determined to be valid at a future point in time within the future time period T. Transmitting or provisioning means (i.e., transmitter(s)) 308, 310, 312 transmit or provide the QoS prediction QP #1, QP #2, QP #4.

According to an example, the apparatus 300 receives or determines at least one reference time indicator characterizing at least one point in time to which the at least one QoS prediction QP #1-4 is related. In particular the at least one point in time is part of a time period T in the future.

According to a further example, the at least one QoS prediction QP #1-4 is further determined based on the reference time indicator.

According to an example, the at least one QoS prediction QP #1-4 is transmitted along with the first reference time indicator.

Receiving means 112, 210 receive a QoS prediction QP #1, QP #2 that characterizes a future QoS associated with the application 100, 200. Determining or processing means 114, 214 determine, based on the QoS prediction QP #1, QP #2, a second future operational parameter P #1, P #2 associated with the application 100, 200. The second operational parameter P #1, P #2, P #4 is determined to be executed at a future point in time within the future time period T.

Receiving means (i.e., receiver(s)) 408 receive the QoS prediction QP #4 that characterizes a future QoS associated with an application 100, 200 or with the radio access network RAN. Determining or processing means (i.e., determining device(s) or processing device(s)) 414 determine, based on the QoS prediction QP #4, the second operational parameter P #4 associated with the radio access network RAN.

According to a block C, a coordination of the applications and the network is conducted. For example, the network initiates the coordination. Determining or processing means (i.e., determining device(s) or processing device(s)) 416 determine a further coordination indicator C #a, C #b that is indicative of the determined second operational parameter P #4 of the radio access network RAN. Transmitting means (i.e., transmitter(s)) 418, 420 transmit the further coordination indicator C #a, C #b. For example, the coordination indicator C #a, C #b comprises the second operational parameter P #4. According to another example, the coordination indicator C #a, C #b is determined based on the determined second operational parameter P #4 associated with the radio access network RAN. Receiving means 218, 120 receive the coordination indicator C #a, C #b.

Determining means (i.e., determining device(s)) 116, 216 determine the further coordination indicator C #c, C #d, C #e, C #f that is indicative of the determined second operational parameter P #1, P #2 of the application 100, 200. Transmitting means (i.e., transmitter(s)) 222, 224, 126, 128 transmit the further coordination indicator C #c, C #d, C #e, C #f. Receiving means (i.e., receiver(s)) 422, 428, 124, 226 receive the coordination indicator C #c, C #d, C #e, C #f. For example, the coordination indicator C #c, C #d, C #e, C #f comprises the second operational parameter P #1, P #2. According to another example, the coordination indicator C #c, C #d, C #e, C #f is determined based on the determined second operational parameter P #1, P2 associated with the application 100, 200.

For example, the received coordination indicator C #d, C #e is associated with or comprises an operational parameter P #2, P #1 of another type of application 200, 100.

Determining or processing means (i.e., determining device(s) or processing device(s)) 130, 230 determine a reaction on the received coordination indicator C #a, C #b, C #d, C #e, wherein the reaction comprises: maintaining the determined second operational parameter P #1, P #2 or adapting the second operational parameter P #1, P #2 based on the received coordination indicator C #a, C #b, C #d, C #e at least at a future point in time within a future time period T. The execution 132, 232 of the function of the application 100, 200 is conducted based on the maintained second operational parameter P #1, P #2 or based on the adapted second operational parameter P #1, P #2.

Determining or processing means (i.e., determining device(s) or processing device(s)) 430 determine a reaction on the received coordination indicator C #c, C #f, wherein the reaction comprises: maintaining the determined second operational parameter P #4 or adapting the second operational parameter P #4 based on the received coordination indicator C #c, C #f at least at a future point in time within a future time period T. The execution 432 of the function of the radio access network RAN is conducted based on the maintained second operational parameter P #4 or based on the adapted second operational parameter P #4.

For example, the coordination indicator C #c, C #f is associated with or comprises an operational parameter P #1, P #2 of the application 100, 200.

According to another example, the coordination indicator of the received coordination message is associated with or comprises an operational parameter P #4 of the radio access network RAN.

Executing or processing means (i.e., executing device(s) or processing device(s)) 132, 232 execute at least one function of the application 100, 200 based on the received coordination indicator C #a, C #b, C #d, C #e. The function of the application 100, 200 includes internal actions taken by the applications like data processing and external actions like moving a roboter arm or actuating a motor for moving a vehicle. The function of the application 100, 200 also includes transmitting or receiving data via radio resources.

Executing or processing means 432 execute function of the radio access network RAN based on the received coordination indicator C #c, C #f.

Figure 2:
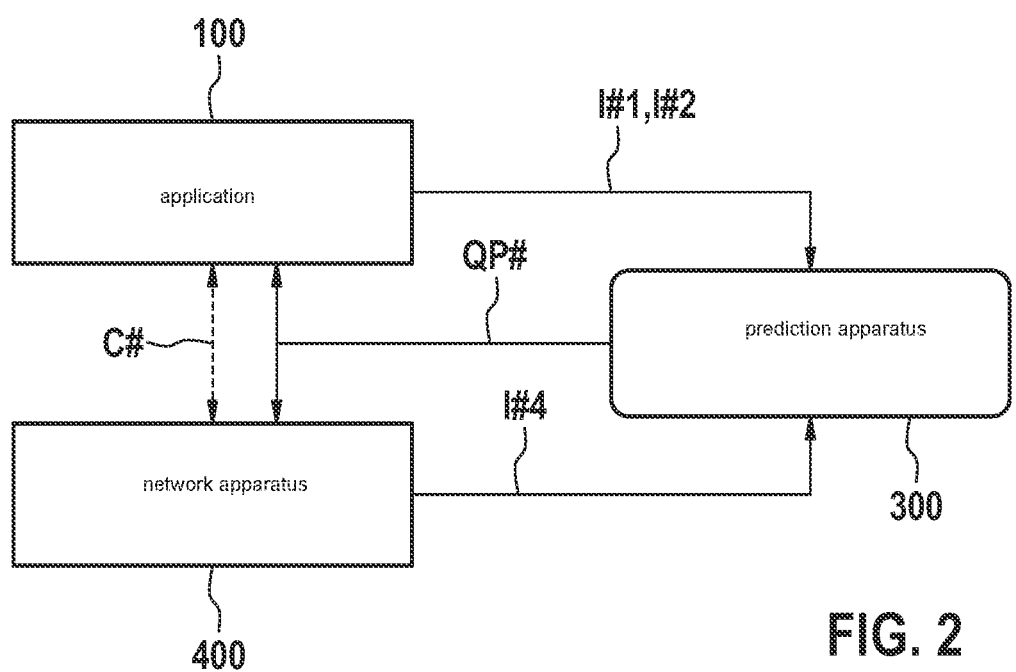
FIG. 2 depicts a schematic block diagram, according to an example embodiment of the present invention.

FIG. 2 depicts schematically an architecture for the prediction and coordination, and illustrates the data traffic between the prediction apparatus 300 and the application/communication network apparatus 100 and 400. The application 100 and the network apparatus 400 provide the information I #1-4 to the prediction apparatus 300. The prediction apparatus 300 determines the QoS prediction QP # and provides it to the application 100 and the apparatus 400. The application 100 and the apparatus 400 of the radio access network coordinate their actions via the coordination indicators C. The prediction unit uses information I # from the application layer and the predicted QoS is fed back to the application apparatus 100, 200 for reactions. Moreover, the traffic between the application apparatus 100, 200 and the apparatus 400, the network controller, at the radio access network provides the coordination for the QoS-based reactions between both sides. Depending on the type of application and the scenario, the level of cooperation and information exchange between network and application layers can vary. For public network deployments, the exchange might be more limited than in the case of industrial campus networks.

Figure 3:
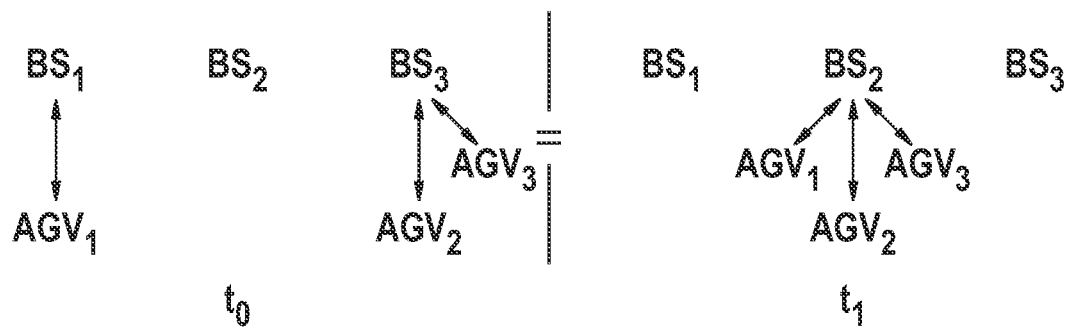
FIG. 3 depicts a state-of-the-art automated guided vehicle (AGV) scenario.

FIG. 3 depicts a state-of-the-art realization of an AGV application (AGV: Automated Guided Vehicle), where multiple AGVs AGV 1-3 move around a factory floor. The AGVs AGV 1-3 are controlled at the application layer by a controller located in a server. The AGV controller informs the communication requirements to the communication network. The wireless communication takes place through three base stations BS 1-3. At time t0 at the left-hand side, the communication network information is transmitted to a prediction unit in order to obtain a prediction for time t1. This information states that AGV 1 is connected to BS 1, and AGVs AGV_2 and AGV_3 are connected to BS 3. BS 2 has no connected AGVs. With the mentioned information, the prediction unit identifies potential QoS issues at BS 3, which can negatively affect the operation of AGV_2 and AGV_3. The predicted information is sent to the communication network controller, who can trigger reactive mechanisms such as, for instance, the reservation of more radio resources for BS 3. At time t1, the AGVs have moved as shown at the right-hand side, where all the AGVs are now connected to BS 2. The prediction based on the communication network information resulted in an overloaded situation at BS 2 and a potential degradation of the QoS for all AGVs.

Figure 4:
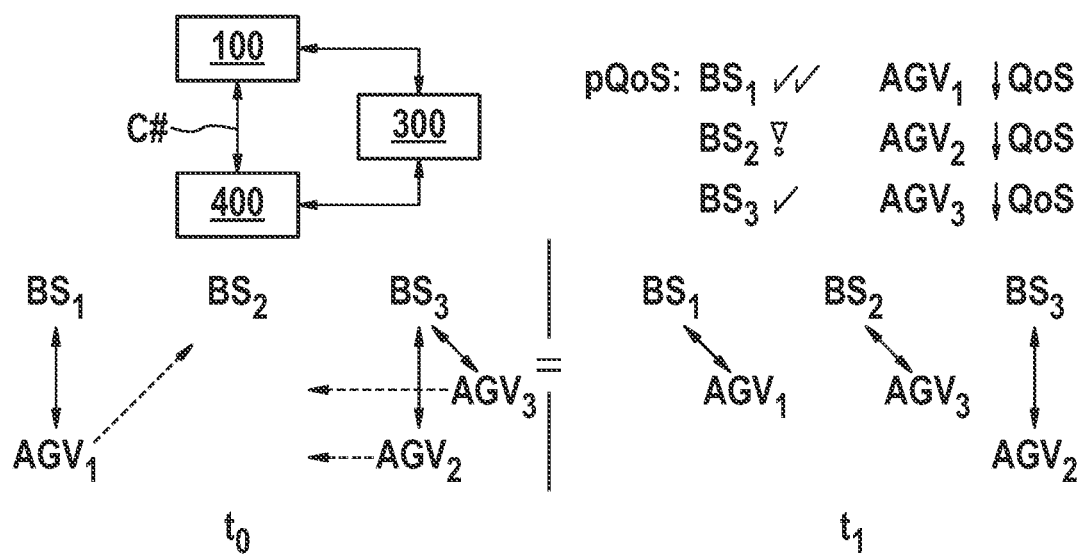
FIG. 4 depicts an AGV scenario with the methods according to the present invention applied.

FIG. 4 depicts an exemplary realization of the methods proposed in this description in the context of AGVs within an industrial campus network. It is worth noting that similar scenarios can be observed in the automotive domain, and can be realized by the proposed methods in this description.

The application 100, that represents an AGV application controller, communicates with the prediction apparatus 300 in order to share application-related information, which can be relevant for the prediction of the QoS. One possible information available at the AGV controller comprises the routes to be followed by the AGVs and where to expect them at time t1. This information is used by the prediction unit 300, in addition to the information provided by the communication network in form of the apparatus 400 in order to determine the QoS prediction. The prediction identifies the potential issue of overload at BS 2 and the following degradation of the QoS for all AGVs. The predicted QoS is reported back to the apparatus 400 and the application 100, which coordinate their reaction to guarantee QoS for all AGVs. Thus, decisions can be made as follows:

1. AGV_1 remains connected to BS 1. The free radio resources at BS 1 compensate for the additional interference caused by BS 2. (Network reaction determined by apparatus 400).
2. AGV_2 slows down to remain connected to BS 3. The communication is guaranteed and the overloading of BS 2 is avoided. (Application reaction by the application 100 at AGV_2).
3. AGV_3 drives regularly and is served by an unloaded BS 2, and QoS is guaranteed (Application reaction by the application 100 at AGV_3).

Figure 5:
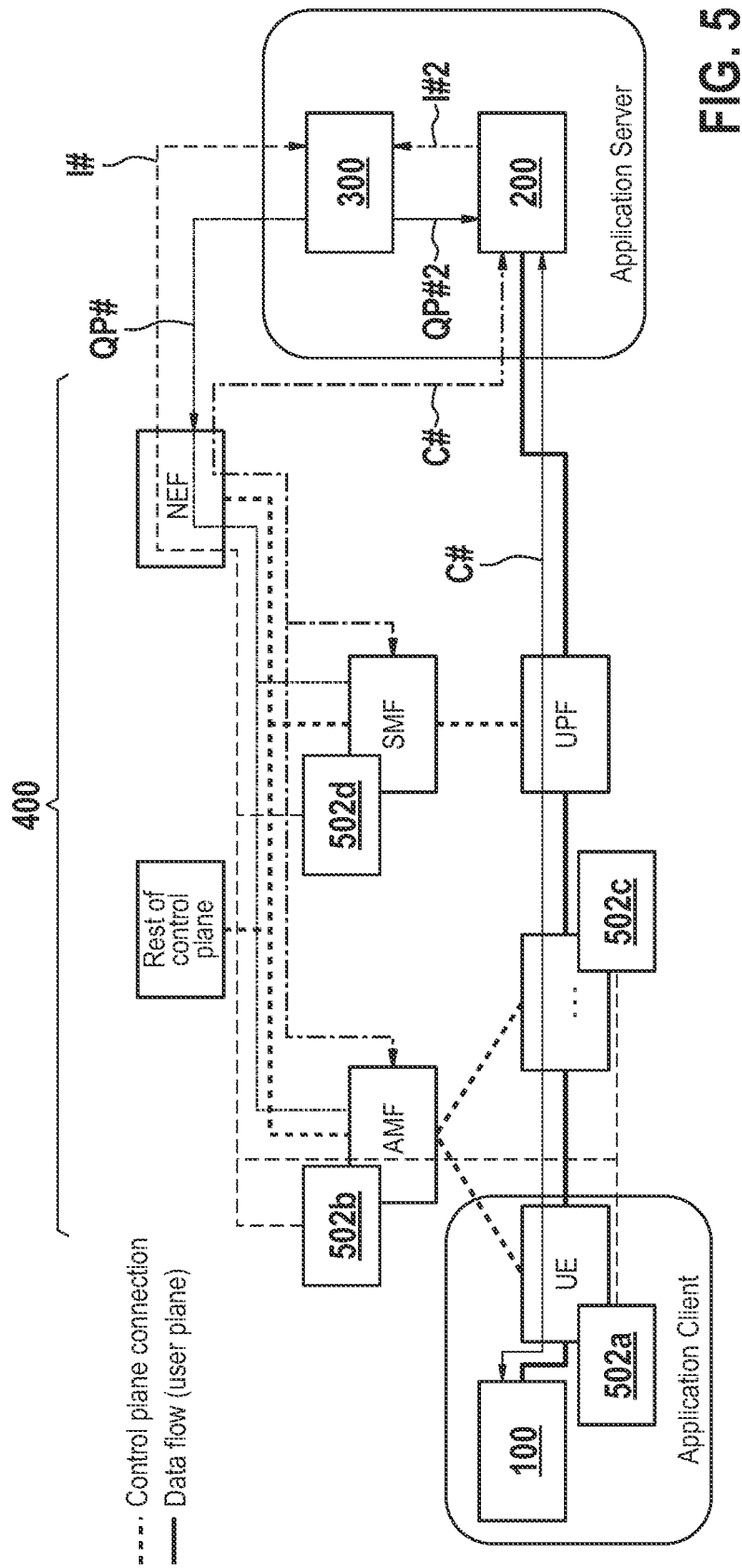
FIGS. 5 and 6 each depict a 5G implementation.
Figure 6:
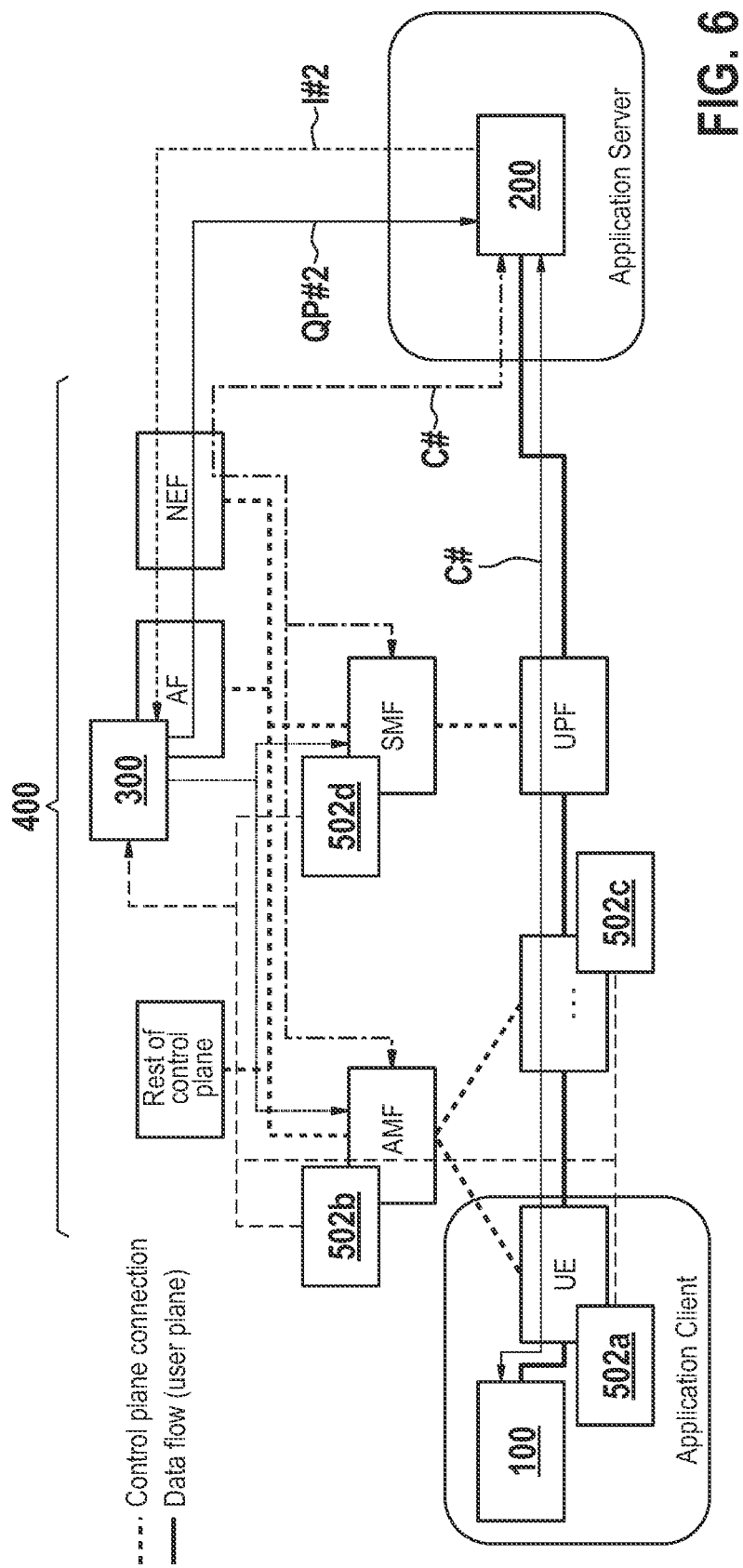

FIGS. 5 and 6 depict schematically different implementations for communicating over a 3GPP 5G network, referenced as 5GS. Although the presented examples below focus on the 5G system. The scope of the presented methods is broader, including other systems such as Wi-Fi. Collection entities 502a-d collect, depending on their ability, network or traffic characteristics like RSSI, RSRP, RSRQ, load of the associated entity, etc., that can be part of the first or second information as outlined above.

In case, that the prediction apparatus 300 is located outside of the 5GS (see FIG. 5), the prediction apparatus 300 is located in the Application Server (e.g. at the edge cloud). 5GS communicates radio and network characteristics to the prediction apparatus 300 through the NEF, Network Exposure Function. The application 100, 200 communicates application characteristics to the prediction apparatus 300 over a direct link. The prediction apparatus 300 communicates the predicted state to the 5GS (e.g. AMF (5G Core Access and Mobility Management Function), SMF (5G Session Management Function)) through the NEF. The prediction apparatus 300 communicates the predicted QoS to the application 100, 200 over a direct link. Application and 5GS (e.g. AMF, SMF) coordinate reactions to the predicted state through the NEF. The Application Server and client sides coordinate their reactions to the predicted state over the user plane.

In the other case according to FIG. 6, the prediction apparatus 300 is located inside of the 5GS, in particular in an Application Function (within the 5GS). 5GS communicates radio and network characteristics to the prediction apparatus 300 over the control plane. The application 100, 200 communicates application characteristics to the prediction apparatus 300 through the NEF. The prediction apparatus 300 communicates the predicted QoS to the 5GS (e.g. AMF, SMF) over the control plane. The prediction apparatus 300 communicates the predicted state to the application 100, 200 through the NEF. Application and 5GS (e.g. AMF, SMF) coordinate reactions to the predicted QoS through the NEF. Application server and client sides coordinate reactions to the predicted state over the user plane.

What is claimed is:

1. A method, comprising the following steps:
   receiving at least one first information that characterizes at least one operational parameter associated with a specific application of a plurality of applications, wherein the at least one operational parameter associated with the specific application includes a number, a size, and/or a periodicity of application messages sent by the specific application via radio resources of a radio access network (RAN);
   receiving at least one second information that characterizes at least one operational parameter associated with the radio access network;
   determining at least one QoS prediction that characterizes a future QoS associated with the specific application based at least on the at least one first information and on the at least one second information; and
   transmitting or providing the at least one QoS prediction;
   wherein:
   (I) the determination of the at least one QoS prediction is made based at least in part on the number of the application messages sent by the specific application via the radio access network;
   (II) the determination of the at least one QoS prediction is made based at least in part on the size of the application messages sent by the specific application via the radio access network;
   (III) the determination of the at least one QoS prediction is made based at least in part on the periodicity at which the specific application sends the application messages via the radio access network; and/or
   (IV) the determination of the at least one QoS prediction is made at an application-level, characterizing the future QoS in association specifically with the specific application, different future QoSs being associated with other ones of the plurality of applications.

2. The method as recited in claim 1, wherein the at least one first information includes a current location of the application, a predicted location of the application, and/or a trajectory of the application.

3. The method as recited in claim 1, wherein the at least one second information includes a resource utilization indicator of the radio access network, a signal strength indicator of the radio access network, and/or a network congestion level.

4. The method as recited in claim 1, wherein the determination of the at least one QoS prediction is made based at least in part on the number of the application messages sent by the specific application via the radio access network.

5. The method as recited in claim 1, wherein the determination of the at least one QOS prediction is made based at least in part on the size of the application messages sent by the specific application via the radio access network.

6. The method as recited in claim 1, wherein the determination of the at least one QoS prediction is made based at least in part on the periodicity at which the specific application sends the application messages via the radio access network.

7. The method as recited in claim 1, wherein the determination of the at least one QoS prediction is made at the application-level, characterizing the future QoS in association specifically with the specific application, the different future QoSs being associated with the other ones of the plurality of applications.

8. An apparatus, comprising:
   a receiver configured to receive at least one first information that characterizes at least one operational parameter associated with a specific application of a plurality of applications, wherein the at least one operational parameter associated with the specific application includes a number, a size, and/or a periodicity of application messages sent by the specific application via radio resources of a radio access network (RAN);
   a receiver configured to receive at least one second information that characterizes at least one operational parameter associated with the radio access network;

a processor, wherein the processor is configured to determine at least one QoS prediction that characterizes a future QoS associated with the specific application based at least on the at least one first information and on the at least one second information; and
a transmitter configured to transmit or provide the at least one QoS prediction;
wherein:
(I) the determination of the at least one QoS prediction is made based at least in part on the number of the application messages sent by the specific application via the radio access network;
(II) the determination of the at least one QoS prediction is made based at least in part on the size of the application messages sent by the specific application via the radio access network;
(III) the determination of the at least one QoS prediction is made based at least in part on the periodicity at which the specific application sends the application messages via the radio access network; and/or
(IV) the determination of the at least one QoS prediction is made at an application-level, characterizing the future QoS in association specifically with the specific application, different future QoSs being associated with other ones of the plurality of applications.

9. A method performed in connection with a transmission of at least one information that characterizes at least one first operational parameter associated with an application, the method comprising:
receiving at least one QOS prediction, which is generated in connection with the transmission and which characterizes a future QoS associated with the application;
determining at least one second operational parameter planned to be implemented by the application based on the future QOS;
receiving a coordination indicator of another operational parameter planned to be implemented by another application or by a network device based on the future QOS;
adjusting the at least one second operational parameter based on the received coordination indicator; and
executing at least one function of the application by implementing the at least one second operational parameter as adjusted by the adjusting.

10. The method according to claim 9, further comprising:
determining at least one further coordination indicator that is indicative of the determined at least one second operational parameter of the application that adjusted; and
transmitting the at least one further coordination indicator.

11. The method according to claim 9, wherein the received coordination indicator is of the other operational parameter planned to be implemented by the other application.

12. The method according to claim 9, wherein the received coordination indicator is of the other operational parameter planned to be implemented by the network device, which is of a radio access network.

13. The method as recited in claim 9, wherein the at least one first operational parameter includes a number, a size, and/or a periodicity of application messages sent by the application via radio resources of a radio access network (RAN).

14. The method as recited in claim 9, wherein the adjusting includes adjusting a data rate.

15. An apparatus, comprising:
a transmitter configured to transmit at least one information that characterizes at least one first operational parameter associated with an application;
a receiver configured to receive at least one QoS prediction that characterizes a future QoS associated with the application; and
a processor system that includes at least one processor;
wherein:
the processor system is configured to determine at least one second operational parameter planned to be implemented by the application based on the future QOS;
the receiver is configured to receive a coordination indicator of another operational parameter planned to be implemented by another application or by a network device based on the future QOS; and
the processor system is configured to:
adjust the at least one second operational parameter based on the received coordination indicator; and
execute at least one function of the application by implementing the at least one second operational parameter as adjusted by the adjustment.

16. A method comprising:
transmitting at least one information that characterizes at least one first operational parameter associated with a radio access network;
receiving at least one QoS prediction that characterizes a future QoS associated with an application;
determining at least one second operational parameter planned to be implemented by the radio access network based on the future QOS;
receiving a coordination indicator of another operational parameter planned to be implemented by the application or another application due to the future QoS that has been predicted;
adjusting the at least one second operational parameter based on the received coordination indicator; and
executing at least one function of the radio access network by implementing the at least one second operational parameter as adjusted by the adjusting.

17. The method according to claim 16, further comprising:
determining at least one further coordination indicator that is indicative of the determined at least one second operational parameter of the radio access network that has been planned to be implemented by the radio access network; and
transmitting the at least one further coordination indicator.

18. The method according to claim 16, wherein the received coordination indicator is of the other operational parameter planned to be implemented by the application.

19. The method as recited in claim 16, wherein the another operational parameter includes a number, a size, and/or a periodicity of application messages sent by the application via radio resources of a radio access network (RAN).

20. The method as recited in claim 16, wherein the adjusting includes adjusting resource allocation of the radio access network.

21. An apparatus, comprising:
a transmitter configured to transmit at least one information that characterizes at least one first operational parameter associated with a radio access network;
a receiver configured to receive at least one QoS prediction that characterizes a future QoS associated with an application; and
a processor system that includes at least one processor;

wherein:
the processor system is configured to determine at least one second operational parameter planned to be implemented by the radio access network based on the future QoS;
the receiver is configured to receive a coordination indicator of another operational parameter planned to be implemented by the application or another application due to the future QoS that has been predicted; and
the processor system is configured to:
adjust the at least one second operational parameter based on the received coordination indicator; and
execute at least one function of the radio access network by implementing the at least one second operational parameter as adjusted by the adjustment.

* * * * *